United States Patent
Chatterjee et al.

(10) Patent No.: US 8,332,354 B1
(45) Date of Patent: Dec. 11, 2012

(54) ASYNCHRONOUS REPLICATION BY TRACKING RECOVERY POINT OBJECTIVE

(75) Inventors: Paresh Chatterjee, Fremont, CA (US);
Raja Jayaraman, Fremont, CA (US);
Loganathan Ranganathan, Fremont, CA (US); Jomy Maliakal, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 309 days.

(21) Appl. No.: 12/638,783

(22) Filed: Dec. 15, 2009

Related U.S. Application Data

(60) Provisional application No. 61/122,579, filed on Dec. 15, 2008.

(51) Int. Cl.
*G06F 7/00* (2006.01)

(52) U.S. Cl. ................ 707/624; 707/639; 707/E17.007

(58) Field of Classification Search ............... 707/999.2, 707/610, E17.007, 999.1, 624, 639
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,604,862 A | 2/1997 | Midgely et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 6,098,128 A | 8/2000 | Velez-McCaskey et al. | |
| 6,434,681 B1 | 8/2002 | Armangau | |
| 6,487,561 B1 | 11/2002 | Ofek et al. | |
| 6,671,757 B1 | 12/2003 | Mutler et al. | |
| 6,694,336 B1 | 2/2004 | Multer et al. | |
| 7,415,486 B2 | 8/2008 | Multer | |
| 7,457,980 B2 | 11/2008 | Yang et al. | |
| 2002/0029227 A1 | 3/2002 | Multer et al. | |
| 2002/0040369 A1 | 4/2002 | Multer et al. | |
| 2005/0044088 A1* | 2/2005 | Lindsay et al. | 707/100 |
| 2005/0228957 A1 | 10/2005 | Satoyama et al. | |
| 2005/0289308 A1* | 12/2005 | Kano | 711/161 |
| 2006/0095696 A1* | 5/2006 | Amano et al. | 711/162 |
| 2006/0206542 A1 | 9/2006 | Wolfgang et al. | |
| 2006/0236047 A1 | 10/2006 | Shitomi | |
| 2007/0112883 A1* | 5/2007 | Asano et al. | 707/202 |
| 2007/0150677 A1 | 6/2007 | Homma et al. | |
| 2007/0162716 A1* | 7/2007 | Yagisawa et al. | 711/162 |
| 2007/0174694 A1* | 7/2007 | Yamamoto et al. | 714/15 |

(Continued)

OTHER PUBLICATIONS

U.S. Appl. No. 11/695,673, filed Apr. 3, 2007 entitled "Snapshot-Assisted Data Replication", Inventors: Chatterjee et al.

(Continued)

*Primary Examiner* — Fred I Ehichioya
*Assistant Examiner* — Shiow-Jy Fan
(74) *Attorney, Agent, or Firm* — Meunier Carlin & Curfman, LLC

(57) ABSTRACT

Technologies are described herein for skipping snapshots during a snapshot replication process in order to maintain an established recovery point objective. A first snapshot is selected after a previously replicated snapshot. A creation time of the first snapshot is retrieved. A difference between a current time and the creation time of the first snapshot is computed. A determination is made as to whether the difference is less than a recovery point objective. If the difference is less than a recovery point objective, then the first snapshot is replicated in the snapshot replicated process. If the difference is not less than a recovery point objective, then the first snapshot is skipped through the snapshot replication process.

16 Claims, 7 Drawing Sheets

U.S. PATENT DOCUMENTS

| | | |
|---|---|---|
| 2008/0052480 A1 | 2/2008 | Satoyama et al. |
| 2008/0104443 A1 | 5/2008 | Akutsu et al. |
| 2008/0244205 A1 | 10/2008 | Amano et al. |
| 2008/0250417 A1* | 10/2008 | Wake .......................... 718/104 |
| 2009/0044046 A1 | 2/2009 | Yamasaki |
| 2009/0055608 A1 | 2/2009 | Yamasaki |

OTHER PUBLICATIONS

U.S. Official Action dated Mar. 27, 2009 in U.S. Appl. No. 11/695,673.

* cited by examiner

ASYNCHRONOUS REPLICATION BY TRACKING RECOVERY POINT OBJECTIVE

CROSS-REFERENCE TO RELATED APPLICATIONS

This application claims the benefit of U.S. provisional patent application No. 61/122,579, filed on Dec. 15, 2008, which is expressly incorporated herein by reference in its entirety.

BACKGROUND

Disaster recovery ("DR") is one of the most pressing issues faced by the storage industry today. DR generally refers to solutions for recovering critical data and/or resuming operation of storage systems and other technology infrastructure. Various factors may be considered when architecting a DR solution. Examples of these factors may include Service Level Agreements ("SLA"), meeting a tolerable Recovery Point Objective ("RPO"), and/or meeting a tolerable Recovery Time Objective ("RTO"). Other factors may include affordability, ease, robustness, reliability, and manageability with respect to each particular solution.

RPO generally refers to an acceptable amount of data loss as measured in time relative to when a disaster occurs. More particularly, RPO may represent the point in time from which an entity should be able to recover stored data. For example, if an entity establishes the RPO as four hours, the entity should be able to recover any stored data that exists at least four hours prior to the disaster. In other words, the entity has established that the loss of data less than four hours old is acceptable.

A conventional solution for recovering lost data in the event of a disaster is storage replication, in which data is written to multiple storage devices across a computer network. Storage replication may be performed at a desired replication rate (i.e., the frequency at which data is replicated), and the replication rate may be configured and adjusted in order to satisfy the established RPO. For example, a higher replication rate may correspond to a lower RPO, while a lower replication rate may correspond to a higher RPO. Further, a higher replication rate may result in a higher number of recovery points from which an entity can recover lost data, while a lower replication rate may result in a lower number of recovery points.

Storage replication may include synchronous replication and asynchronous replication. In synchronous replication, when a primary storage device finishes writing a first chunk of data, a secondary storage device must finish writing the first chunk of data before the primary storage device can begin writing a second chunk of data. A drawback with synchronous replication is the latency caused when the primary storage device copies the first chunk of data, transfers the first chunk of data across the computer network, and waits for the secondary storage device to finish writing the first chunk of data.

In asynchronous replication, after the primary storage device finishes writing the first chunk of data, the primary storage device can begin writing the second chunk of data without waiting for the secondary storage device to finish writing the first chunk of data. While asynchronous replication does not experience the latency of synchronous replication, a drawback of asynchronous replication is potential data loss caused when the primary storage device fails before the secondary storage device completes writing the data. This can be particularly troublesome if the secondary storage device suffers any lag caused by high input/output ("I/O") load in the primary storage device, reduced network link speed, network link failures, and the like. In particular, as a result of the lag, the secondary storage device may not be able to maintain the desired replication rate, and thereby may not be able to satisfy the established RPO.

It is with respect to these and other considerations that the disclosure made herein is presented.

SUMMARY

Technologies are described herein for skipping one or more snapshots during a snapshot replication process in order to maintain an established recovery point objective. In particular, some technologies are provided for skipping snapshots based on time-related parameters. Further technologies are provided for skipping snapshots based on delta data-related parameters.

According to one aspect presented herein, a first snapshot is selected after a previously replicated snapshot. A creation time of the first snapshot is retrieved. A difference between a current time and the creation time of the first snapshot is computed. A determination is made as to whether the difference between a current time and the creation time of the first snapshot is less than a recovery point objective. If the difference between a current time and the creation time of the first snapshot is less than a recovery point objective, then the first snapshot is replicated in the snapshot replicated process. If the difference between a current time and the creation time of the first snapshot is not less than a recovery point objective, then the first snapshot is skipped through the snapshot replication process.

According to another aspect presented herein, a snapshot sequence including a plurality of snapshots is received. A number of delta data chunks between each snapshot in the snapshot sequence is determined. A sum of the numbers of delta data chunks between the snapshots in the snapshot sequence is computed. A number of delta data chunks between a first snapshot and a last snapshot in the snapshot sequence is determined. A determination is made as to whether the number of delta data chunks between the first snapshot and the last snapshot in the snapshot sequence is substantially less than the sum. If the number of delta data chunks between the first snapshot and the last snapshot in the snapshot sequence is substantially less than the sum, then intermediate snapshots in the snapshot sequence are skipped, and the last snapshot in the snapshot sequence is replicated through the snapshot replication process.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
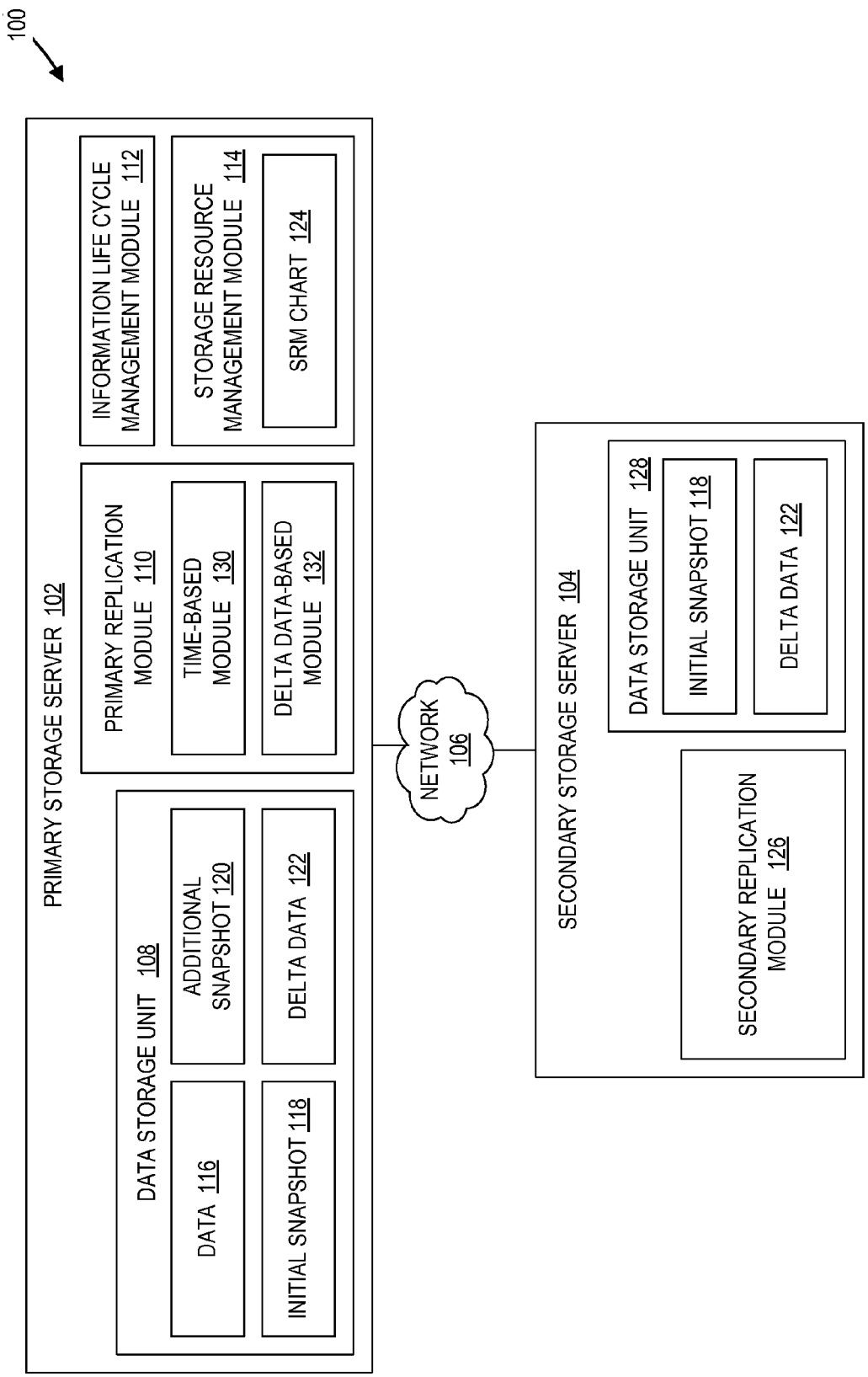
FIG. 1 is a network architecture diagram of a storage replication system configured to implement embodiments of a novel asynchronous replication solution described herein, in accordance with some embodiments.

The following detailed description is directed to technologies for skipping one or more snapshots during a snapshot replication process in order to maintain an established recovery point objective, in accordance with some embodiments. As used herein, a "snapshot" refers to a record of the data on a data volume as it existed at a particular point in time. In an example implementation, a storage replication solution may take a snapshot of a first data volume. Upon taking the snapshot, the storage replication solution may transfer the snapshot to a second data volume over a network. The storage replication solution may then write the snapshot into the second data volume, thereby replicating the snapshot. Upon writing the snapshot into the second data volume, the storage replication solution may take an additional snapshot of the second data volume. The storage replication solution can then transfer the additional snapshot to a third data volume. This snapshot replication solution can continue for additional data volumes as desired.

The storage replication solution may take multiple snapshots of the first data volume at a predefined schedule or under the direction of an administrator. The storage replication solution may then replicate the snapshots through synchronous or asynchronous replication. In the event of a disaster that corrupts the first data volume, the administrator can restore the first data volume based on at least one of the replicated snapshots. A greater number of replicated snapshots may provide a greater number of recovery points from which the administrator can restore the first data volume.

In some implementations, the storage replication solution may implement snapshot-assisted replication. In snapshot-assisted replication, the storage replication solution may generate an initial snapshot of the first data volume and replicate the initial snapshot on the second data volume. When the storage replication solution generates each additional snapshot following the initial snapshot, the storage replication solution does not replicate the entire additional snapshot on the second data volume. Instead, the storage replication solution replicates only delta data (i.e., the block-level differences) between each additional snapshot and the immediate preceding snapshot. Thus, the delta data may include new data and modified data, but might not include old data that remains the same. By implementing snapshot-assisted replication, the storage replication solution can significantly reduce the amount of data that needs to be replicated.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, FIG. 1 shows an illustrative network architecture diagram of a storage replication system 100 configured to implement embodiments of a novel asynchronous replication solution described herein. In particular, the storage replication system 100 includes a primary storage server 102 and a secondary storage server 104 coupled via a network 106. Although only two storage servers 102, 104 are illustrated in FIG. 1, it should be appreciated that the storage replication system 100 may implement additional storage servers.

As illustrated in FIG. 1, the primary storage server 102 includes a data storage unit 108, a primary replication module 110, an information life cycle management ("ILM") module 112, and a storage resource management ("SRM") module 114. The data storage unit 108 may store data 116, multiple snapshots including an initial snapshot 118 and an additional snapshot 120, and delta data 122. The primary replication module 110 may include a time-based module 130 and a delta data-based module 132. The SRM module 114 may be configured to provide an SRM chart 124. Also as illustrated in FIG. 1, the secondary storage server 104 includes a secondary replication module 126 and a data storage unit 128. Although not so illustrated in FIG. 1, the secondary replication module 126 may also implement at least a portion of the time-based module 130 and/or the delta data-based module 132. The data storage unit 128 may store data, including the initial snapshot 118 and the delta data 122, corresponding to the snapshot replication process performed by the primary replication module 110 and the secondary replication module 126. As used herein, a snapshot is "replicated" if the entire snapshot or the corresponding delta data has been written to the data storage unit 128.

According to some embodiments, the primary replication module 110 may take the initial snapshot 118 of the data 116. Upon taking the initial snapshot 118, the primary replication module 110 may transfer the initial snapshot 118 to the secondary storage server 104 over the network 106. The secondary replication module 126 may receive the initial snapshot 118 and write the initial snapshot 118 to the data storage unit 128. After the taking the initial snapshot 118, the primary replication module 110 may take additional snapshots, such as the additional snapshot 120. Upon taking the additional snapshot 120, the primary replication module 110 may generate the delta data 122 identifying the block-level differences between the immediately preceding snapshot (in this case, the initial snapshot 118) and the additional snapshot 120. For example, the delta data 122 may include new data and modified data, but might not include old data that remains the same. The primary replication module 110 may then transfer the delta data 122, instead of the entire additional snapshot 120, to the secondary storage server 104 over the network 106. The secondary replication module 126 may receive the delta data 122 and write the delta data 122 to the data storage unit 128.

According to some embodiments, the primary replication module 110 may take snapshots, such as the initial snapshot 118 and the additional snapshot 120, at a predefined schedule or upon the direction of an administrator. For the sake of illustration, in the embodiments described herein, the primary replication module 110 is adapted to take snapshots at regular intervals. For example, if the primary replication module 110 is configured to take snapshots every two hours and the initial snapshot 118 is taken at 8 AM, then the primary replication module 110 may take additional snapshots at 10 AM, 12 PM, 2 PM, etc.

In asynchronous replication, the primary replication module 110 may take snapshots according to the predefined schedule irrespective of whether the secondary replication module 126 has completed replicating the preceding snapshot. In order to satisfy an established RPO, the secondary replication module 126 may be required to replicate snapshots at a replication rate that is within an established RPO. In order to create additional recovery points, the secondary replication module 126 may take and replicate snapshots at a greater replication rate than necessary for satisfying the RPO. For example, when the established RPO is four hours, the primary replication module 110 may take and replicate snapshots every two hours. A greater number of recovery points may provide an administrator a greater number of states from which the administrator can restore the data 116.

When the storage replication system 100 is operating properly, the snapshots are taken and replicated at a replication rate that satisfies the RPO. However, in some cases, the secondary replication module 126 may experience lag whereby the secondary replication module 126 cannot replicate the snapshots at a replication rate that satisfies the established RPO. The lag may be caused by I/O load in the primary storage server 102, reduced network link speed on the network 106, intermittent link failures on the network 106, and the like. If the secondary storage server 104 cannot replicate the snapshots at a replication rate that satisfies the RPO, then an administrator will not be able to restore the data 116 to a state within the RPO.

According to embodiments described herein, the primary replication module 110 can mitigate the effects of the lag by selectively skipping the replication of some snapshots. In particular, the time-based module 130 may be adapted to selectively skip the replication of one or more snapshots based on time-related parameters. Further, the delta data-based module 132 may be adapted to selectively skip the replication of one or more snapshots based on delta data-related parameters. The operation of the time-based module 130 and the delta data-based module 132, along with the ILM module 112 and the SRM module 114, will be described in greater detail below with respect to FIGS. 2-6.

Figure 2:
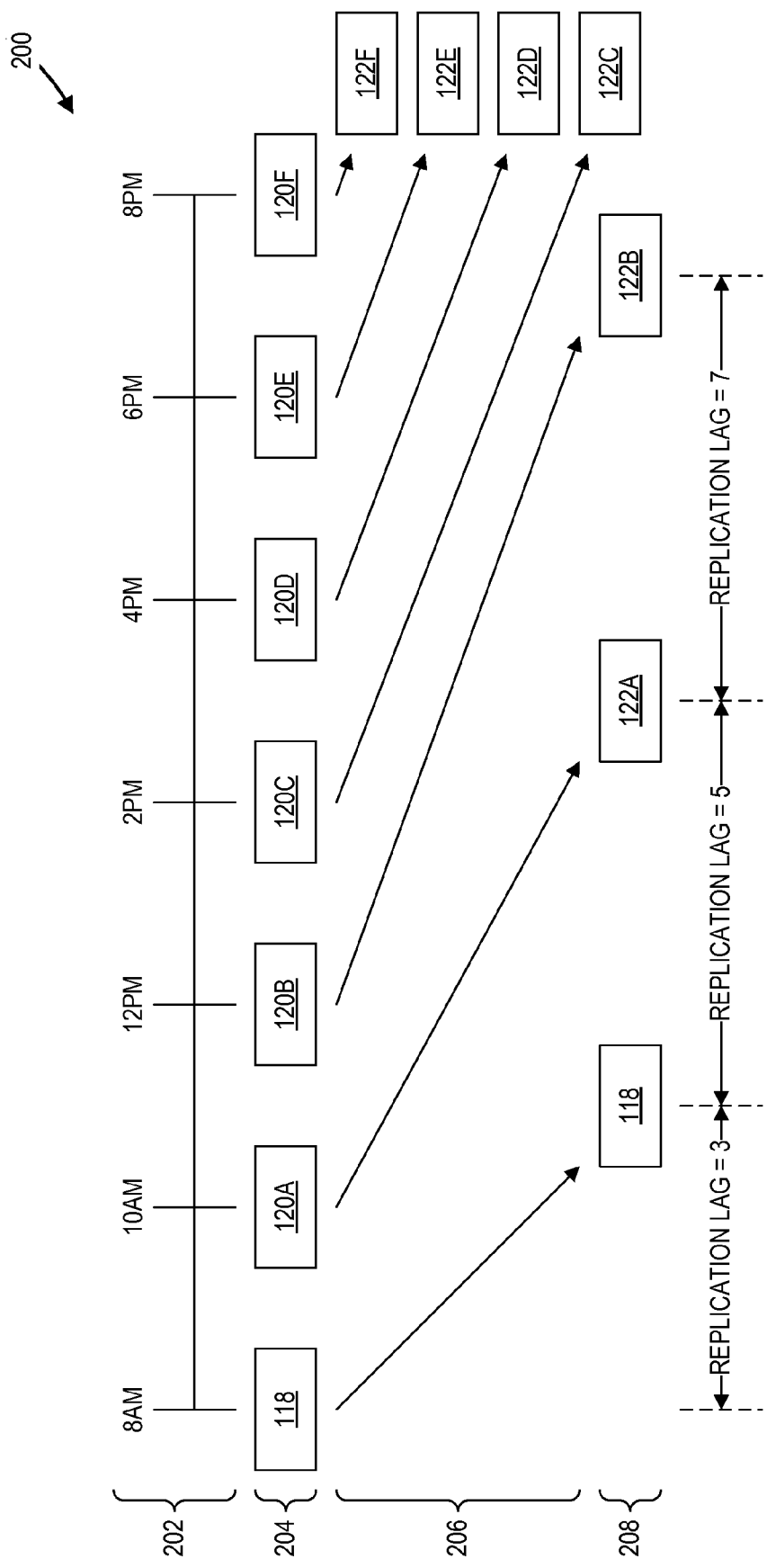
FIG. 2 is a diagram showing the operation of the time-based module, in accordance with some embodiments.

Referring now to FIG. 2, additional details regarding the operation of the time-based module 130 will be described according to some embodiments. As illustrated in FIG. 2, a diagram 200 shows a replication sequence between the primary storage server 102 and the secondary storage server 104 across the network 106. In particular, the diagram 200 includes a timeline 202, a first portion 204, a transfer portion 206, and a second portion 208. The timeline 202 shows the time when actions are performed within the first portion 204, the transfer portion 206, and the second portion 208. The first portion 204 shows actions performed by the primary replication module 110, and the second portion 208 shows actions preformed by the secondary replication module 126. The transfer portion 206 shows data transfers across the network 106 between the primary replication module 110 and the secondary replication module 126.

According to some embodiments, the primary replication module 110 may be adapted to take snapshots at regular intervals. In the example illustrated in FIG. 2, the primary replication module 110 takes snapshots in two hour intervals. For example, the primary replication module 110 takes the initial snapshot 118 at 8 AM and additional snapshots 120A-120F at 10 AM, 12 PM, 2 PM, 4 PM, and 8 PM, respectively. Upon taking the initial snapshot 118 at 8 AM, the primary replication module 110 transfers the initial snapshot 118 to the secondary storage server 104. The secondary replication module 126 then receives the initial snapshot 118 and completes writing the initial snapshot 118 to the data storage unit 128 at 11 AM, resulting in a replication lag of three hours (i.e., 11 AM–8 AM). As used herein, the "replication lag" refers the difference between the time that the primary replication module 110 takes the snapshot and the time that the secondary replication module 126 completes replicating the snapshot.

In the example illustrated in FIG. 2, the primary replication module 110 takes the first additional snapshot 120A at 10 AM. As previously described, the primary replication module 110 may transfer corresponding first delta data 122A, rather than transfer the entire first additional snapshot 120A. The first delta data 122A may represent the block-level differences between the initial snapshot 118 and the first additional snapshot 120A. Upon taking the first additional snapshot 120A at 10 AM, the primary replication module 110 transfers the first delta data 122A to the secondary storage server 104. The secondary replication module 126 then receives the first delta data 122A and writes the first delta data 122A to the data storage unit 128 at 3 pm, resulting in a replication lag of five hours (i.e., 3 PM–10 AM).

The primary replication module 110 further takes the second additional snapshot 120B at 12 PM. The second delta data 122B represents the differences between the second additional snapshot 120B and the first additional snapshot 120A. Upon taking the second additional snapshot 120B, the primary replication module 110 transfers the second delta data 122B to the secondary storage server 104. The secondary replication module 126 then receives the second delta data 122B and writes the second delta data 122B to the data storage unit 128 at 7 pm, resulting in a replication lag of seven hours (i.e., 7 PM–12 PM). The additional snapshots 120C-120F may correspond to additional delta data 122C-120F transferred from the primary storage server 102 to the secondary storage server 104 and written to the data storage unit 128 and later points (not shown) along the timeline 202.

As illustrated in FIG. 2, the replication lag continues to grow from three hours to five hours to seven hours. As the replication lag increases, the secondary replication module 126 might not sustain a replication rate that satisfies the established RPO. For example, if the RPO is four hours and the data storage unit 108 becomes damaged at 5 PM, an administrator should be able to recover the state of the data no later than at 1 PM. However, in the example illustrated in FIG. 2, an administrator can only recover the state of the data 116 at 10 AM through the first delta data 122A. Although the primary replication module 110 has taken the third additional snapshot 120C at 2 PM, which is within the RPO of four hours, the secondary replication module 126 has not written the corresponding third delta data 122C to the data storage unit 128 by 5 PM due to lag.

In order to address the reduced replication rate caused by lag, the time-based module 130 may be adapted to selectively skip one or more snapshots based on the creation time of a snapshot and the current time after the immediately preceding snapshot is replicated. In some embodiments, the time-based module 130 may operate as follows. For the sake of illustration, snapshots may be represented by variable S, where a subscript identifies a particular snapshot. Thus, the initial snapshot 118 may be represented by variable $S_n$, and the additional snapshots 120A-120F may be represented by variables $S_{n+1}$, $S_{n+2}$, $S_{n+3}$, $S_{n+4}$, $S_{n+5}$, $S_{n+6}$, respectively. The creation time for each snapshot S may be represented by variable Tc, where a subscript corresponds to a particular snapshot. Thus, the creation times corresponding to the initial snapshot 118 and the additional snapshots 120A-120F may be represented by variables $Tc_n$, $Tc_{n+1}$, $Tc_{n+2}$, $Tc_{n+3}$, $Tc_{n+4}$, $Tc_{n+5}$, $Tc_{n+6}$, respectively. The current time after the immediately preceding snapshot is replicated may be represented by variable Tcurr.

The time-based module 130 may decide whether to skip a given snapshot based on the difference between the current time after the immediately preceding snapshot is replicated (hereinafter referred to simply as "current time") and the creation time of a given snapshot. Each snapshot may be incrementally evaluated starting with the first snapshot following the immediately preceding snapshot that is replicated. In particular, the first difference between the current time and the creation time of a first evaluated snapshot may be computed. If the first difference is less than the established RPO, then the first evaluated snapshot is replicated by the secondary replication module 126. If the first difference is greater than the established RPO, then a second difference between the current time and the creation time of a second evaluated snapshot is computed. If the second difference is less than the established RPO, then the second evaluated snapshot is replicated by the secondary replication module 126. If the second difference is greater than the established RPO, then a third difference between the current time and the creation time of a third evaluated snapshot is computed. The time-based module 130 can repeat this process for additional snapshots until the computed difference is less than the established RPO.

The difference between the current time after the immediately preceding snapshot is replicated and the creation time for an evaluated snapshot may be represented by the variable Td, where a subscript corresponds to a particular snapshot. Thus, the differences $Td_{n+1}$, $Td_{n+2}$, $Td_{n+3}$, $Td_{n+4}$, $Td_{n+5}$, and $Td_{n+6}$ may correspond to snapshots $S_{n+1}$, $S_{n+2}$, $S_{n+3}$, $S_{n+4}$, $S_{n+5}$, $S_{n+6}$, respectively. The difference Td may be computed by the following formula: Td=Tcurr-Tc.

As illustrated in FIG. 2, the initial snapshot 118 ($S_n$) has a corresponding creation time ($Tc_n$) at 8 AM. When the secondary replication module 126 replicates the initial snapshot 118 ($S_n$), the current time (Tcurr) is 11 AM. The time-based module 130 then makes a determination as to whether the first difference ($Td_{n+1}$) is less than established RPO. In this case, the first difference ($Td_{n+1}$) is one hour, where $Td_{n+1}$=Tcurr-$Tc_{n+1}$ or $Td_{n+1}$=11 AM-10 AM. The first difference ($Td_{n+1}$) of one hour is less than the established RPO of four hours. As a result, the secondary replication module 126 may replicate the first additional snapshot 120A ($S_{n+1}$) by writing the corresponding first delta data 122A to the data storage unit 128.

When the secondary replication module 126 replicates the first additional snapshot 120A ($S_{n+1}$), the current time (Tcurr) is 3 PM. The time-based module 130 then makes a determination as to whether the second difference ($Td_{n+2}$) is less than the established RPO. In this case, the second difference ($Td_{n+2}$) is three hours, where $Td_{n+2}$=Tcurr-$Tc_{n+2}$ or $Td_{n+2}$=3 PM-12 PM. The second difference ($Td_{n+2}$) of three hours is less than the established RPO of four hours. As a result, the secondary replication module 126 may replicate the second additional snapshot 120B ($S_{n+2}$) by writing the corresponding second delta data 122B to the data storage unit 128.

When the secondary replication module 126 replicates the second additional snapshot 120B ($S_{n+2}$), the current time (Tcurr) is 7 PM. The time-based module 130 then makes a determination as to whether the third difference ($Td_{n+3}$) is less than the established RPO. In this case, the third difference ($Td_{n+3}$) is five hours, where $Td_{n+3}$=Tcurr-$Tc_{n+3}$ or $Td_{n+3}$=7 PM-2 PM. The third difference ($Td_{n+3}$) of five hours is greater than the established RPO of four hours. As a result, the time-based module 130 may skip the third additional snapshot 120C ($S_{n+3}$) and evaluate the next incremental snapshot, which is the fourth additional snapshot 120D ($S_{n+4}$). The time-based module 130 then makes a determination as to whether the fourth difference ($Td_{n+4}$) is less than established RPO. In this case, the fourth difference ($Td_{n+4}$) is three hours, where $Td_{n+4}$=Tcurr-$Tc_{n+4}$ or $Td_{n+4}$=7 PM-4 PM. The fourth difference ($Td_{n+4}$) of three hours is less than the established RPO of four hours. As a result, the secondary replication module 126 may replicate the fourth additional snapshot 120D ($S_{n+4}$) by writing the corresponding delta data 122D to the data storage unit 128, thereby skipping the third additional snapshot 120C ($S_{n+3}$).

In another example (not illustrated in FIG. 2), when the secondary replication module 126 replicates the second additional snapshot 120B ($S_{n+2}$), the current time (Tcurr) is 9 PM. The time-based module 130 then makes a determination as to whether the third difference ($Td_{n+3}$) is less than the established RPO. In this case, the third difference ($Td_{n+3}$) is seven hours, where $Td_{n+3}$=Tcurr-$Tc_{n+3}$ or $Td_{n+2}$=9 PM-2 PM. The third difference ($Td_{n+3}$) of seven hours is greater than the established RPO of four hours. As a result, the time-based module 130 may skip the third additional snapshot 120C ($S_{n+3}$) and evaluate the next incremental snapshot, which is the fourth additional snapshot 120D ($S_{n+4}$).

The time-based module 130 then makes a determination as to whether the fourth difference ($Td_{n+4}$) is less than established RPO. In this case, the fourth difference ($Td_{n+4}$) is five hours, where $Td_{n+4}$=Tcurr-$Tc_{n+4}$ or $Td_{n+4}$=9 PM-4 PM. The fourth difference ($Td_{n+4}$) of five hours is greater than the established RPO of four hours. As a result, the time-based module 130 may skip the fourth additional snapshot 120D ($S_{n+4}$) and evaluate the next incremental snapshot, which is the fifth additional snapshot 120E ($S_{n+5}$). The time-based module 130 then makes a determination as to whether the fifth difference ($Td_{n+5}$) is less than established RPO. In this case, the fifth difference ($Td_{n+5}$) is three hours, where $Td_{n+5}$=Tcurr-$Tc_{n+5}$ or $Td_{n+5}$=9 PM-6 PM. The fifth difference ($Td_{n+5}$) of three hours is less than the established RPO of four hours. As a result, the secondary replication module 126 may replicate the fifth additional snapshot 120E ($S_{n+5}$) by writing the corresponding fifth delta data 122E to the data storage unit 128, thereby skipping the third additional snapshot 120C ($S_{n+3}$) and the fourth additional snapshot 120D ($S_{n+4}$).

Figure 3:
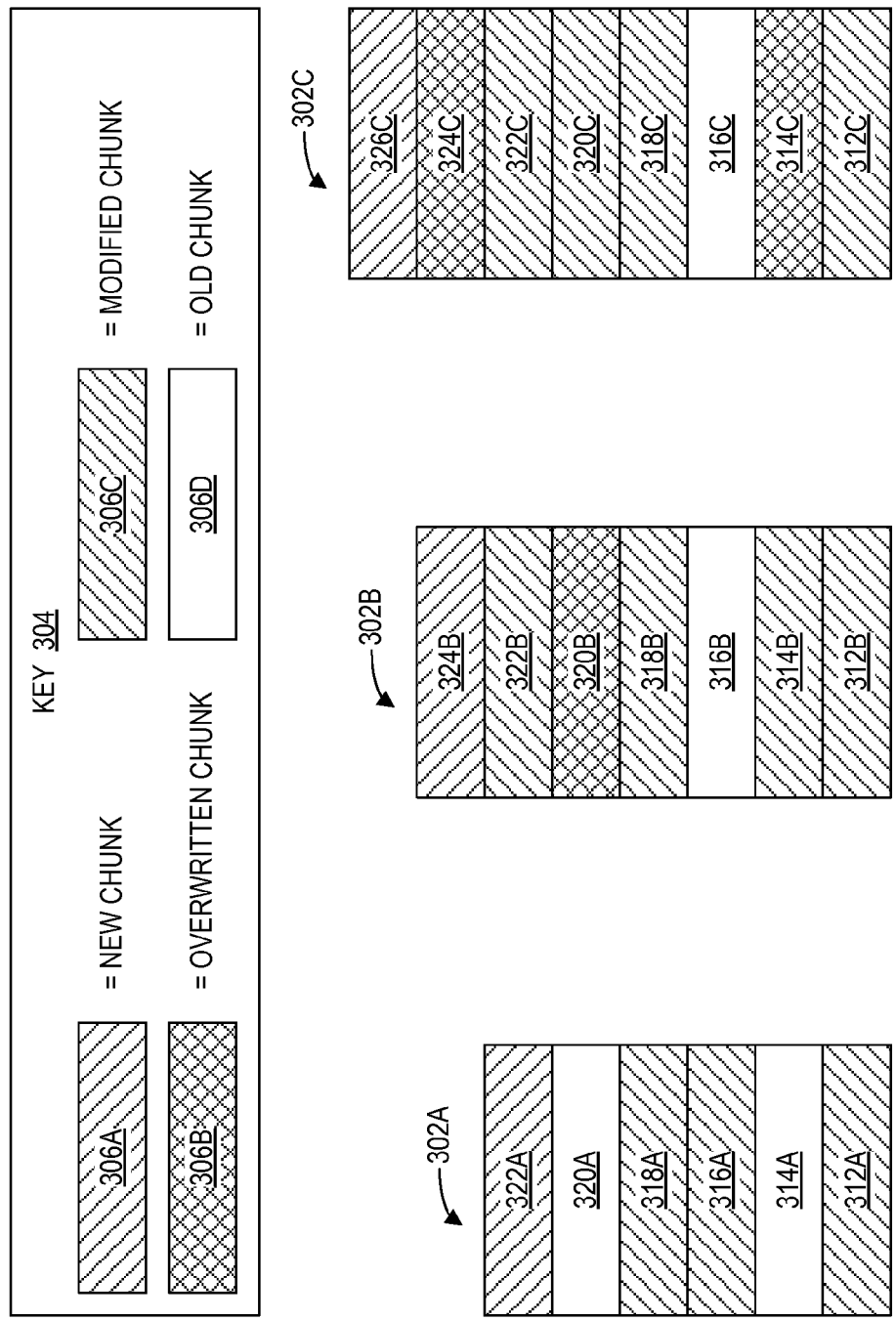
FIG. 3 is a block diagram showing the operation of the delta data-based module in accordance with some embodiments.

Referring now to FIG. 3, additional details regarding the operation of the delta data-based module 132 will be described according to some embodiments. As illustrated in FIG. 3, a diagram 300 shows three snapshots 302A-302C of the data 116 taken at sequential intervals along the timeline 202. For example, the first snapshot 302A may be taken at 2 AM, the second snapshot 302B may be taken at 4 AM, and the third snapshot 302C may be taken at 6 AM. The diagram 300 further includes a key 304 that identifies types 306A-306D of chunks.

As used herein, a "chunk" or "block" may refer to a segment of the data 116. The first type 306A of data is a new chunk. A new chunk of data refers to a segment of data that is not found in previously-taken snapshots. The second type 306B of data is an overwritten chunk. An overwritten chunk refers to a segment of data that has been modified more than once (i.e., frequently modified data). The third type 306C of data is a modified chunk. A modified chunk refers to a segment of data that is modified for the first time (i.e., just modified data). The fourth type 306D of data is an old chunk. An old chunk refers to a segment of data that remains the same.

As shown in FIG. 3, the first snapshot 302A includes a first chunk 312A, a second chunk 314A, a third chunk 316A, a fourth chunk 318A, a fifth chunk 320A, and a sixth chunk 322A. The first chunk 312A, the third chunk 316A, and the fourth chunk 318A are modified chunks. The second chunk 314A and the fifth chunk 320A are old chunks. The sixth chunk 322A is a new chunk.

The second snapshot 302B includes a first chunk 312B, second chunk 314B, a third chunk 316B, a fourth chunk 318B, a fifth chunk 320B, a sixth chunk 322B, and a seventh chunk 324B. The first chunk 312B, the second chunk 314B, the third chunk 316B, the fourth chunk 318B, the fifth chunk 320B, and the sixth chunk 322B correspond to the first chunk 312A, the second chunk 314A, the third chunk 316A, the fourth chunk 318A, the fifth chunk 320A, and the sixth chunk 322A, respectively. The first chunk 312B, the second chunk 314B, the fourth chunk 318B, and the sixth chunk 322B are modified chunks. The fifth chunk 320B is an overwritten chunk. The third chunk 316B is an old chunk. The seventh chunk 324B is a new chunk.

The third snapshot 302C includes a first chunk 312C, second chunk 314C, a third chunk 316C, a fourth chunk 318C, a fifth chunk 320C, a sixth chunk 322C, a seventh chunk 324C, and an eighth chunk 326C. The first chunk 312C, the second chunk 314C, the third chunk 316C, the fourth chunk 318C, the fifth chunk 320C, and the sixth chunk 322C correspond to the first chunk 312A, the second chunk 314A, the third chunk 316A, the fourth chunk 318A, the fifth chunk 320A, and the sixth chunk 322A, respectively. The first chunk 312C, the fourth chunk 318C, the fifth chunk 320C, and the sixth chunk 322C are modified chunks. The second chunk 314C and the seventh chunk 324C are overwritten chunks. The third chunk 316C is an old chunk. The eighth chunk 326C is a new chunk.

According to some embodiments, the delta data-based module 132 may operate as follows. The delta data-based module 132 may evaluate snapshots following the immediately preceding snapshot that is replicated. In the example illustrated in FIG. 3, the first snapshot 302A is the last snapshot that is replicated. The delta data-based module 132 may evaluate snapshots following the first snapshot 302A, such as the second snapshot 302B and the third snapshot 302C, that have been created up to the current time. As used herein, a "snapshot sequence" refers to the set of evaluated snapshots. In this example, the snapshot sequence includes the first snapshot 302A, the second snapshot 302B, and the third snapshot 302C.

Given the snapshot sequence, the delta data-based module 132 may identify the number of delta data chunks between each snapshot in the snapshot sequence. The delta data-based module 132 may further identify the number of delta data chunks between the first snapshot in the snapshot sequence and the last snapshot in the snapshot sequence. As used herein, the "delta data" refers to the new data, the overwritten data, and the modified data, but does not include the old data. In some embodiments, the ILM module 112 may identify the delta data in the snapshots 302A-302C.

For example, the delta data-based module 132 may identify the number of delta data chunks between the first snapshot 302A and the second snapshot 302B. In this case, the delta data-based module 132 may identify six delta data chunks (i.e., the first chunk 312B, the second chunk 314B, the fourth chunk 318B, the fifth chunk 320B, the sixth chunk 322B, and the seventh chunk 324B) between the first snapshot 302A and the second snapshot 302B. The delta data-based module 132 may also identify the number of delta data chunks between the second snapshot 302B and the third snapshot 302C. In this case, the delta data-based module 132 may identify seven delta data chunks (i.e., the first chunk 312C, the second chunk 314C, the fourth chunk 318C, the fifth chunk 320C, the sixth chunk 322C, the seventh chunk 324C, and the eighth chunk 326C) between the second snapshot 302B and the third snapshot 302C. The delta data-based module 132 may further identify the number of delta data chunks between the first snapshot 302A (i.e., the first snapshot in the snapshot sequence) and the third snapshot 302C (i.e., the last snapshot in the snapshot sequence). In this case, the delta data-based module 132 may identify seven delta data chunks (i.e., the first chunk 312C, the second chunk 314C, the fourth chunk 318C, the fifth chunk 320C, the sixth chunk 322C, the seventh chunk 324C, and the eighth chunk 326C) between the first snapshot 302A and the third snapshot 302C.

Upon identifying the number of delta data chunks between each snapshot in the snapshot sequence and between the first snapshot in the snapshot sequence and the last snapshot in the snapshot sequence, the delta data-based module 132 then computes the sum of the numbers of delta data chunks between the snapshots. In this example, the delta data-based module 132 identified six delta data chunks between the first snapshot 302A and the second snapshot 302B and seven delta data chunks between the second snapshot 302B and the third snapshot 302C. Thus, the sum of the numbers of delta data chunks between the snapshots 302A-302C is thirteen (i.e., 13=6+7). The delta data-based module 132 then compares the number of delta data chunks between the first snapshot 302A and the third snapshot 302C and the sum of the numbers of delta data chunks between the snapshots 302A-302C. If the number of delta data chunks between the first snapshot 302A and the third snapshot 302C is substantially less than the sum of the numbers of delta data chunks between the snapshots 302A-302C, then the intermediate snapshots, such as the second snapshot 302B, can be skipped. If the number of delta data chunks between the first snapshot 302A and the third snapshot 302C is not substantially less than the sum of the numbers of delta data chunks between the snapshots 302A-302C, then the intermediate snapshots are not skipped.

In this example, the delta data-based module 132 may determine that seven delta data chunks (i.e., the number of delta data chunks between the first snapshot 302A and the third snapshot 302C) is substantially less than the than thirteen delta data chunks (i.e., the sum of the numbers of delta data chunks between the snapshots 302A-302C). The delta data-based module 132 may determine whether the number of delta data chunks between the first snapshot 302A and the third snapshot 302C is substantially less than the sum of the numbers of delta data chunks between the snapshots 302A-302C based on a suitable threshold. For example, the threshold may be a percentage, where the delta data-based module 132 may determine whether the number of delta data chunks between the first snapshot 302A and the third snapshot 302C is less than the sum of the numbers of delta data chunks between the snapshots 302A-302C by at least the threshold percentage. Other mathematical constructs may be similarly utilized. The threshold may be configured according to any suitable criteria, such as reducing the replication lag.

Figure 4:
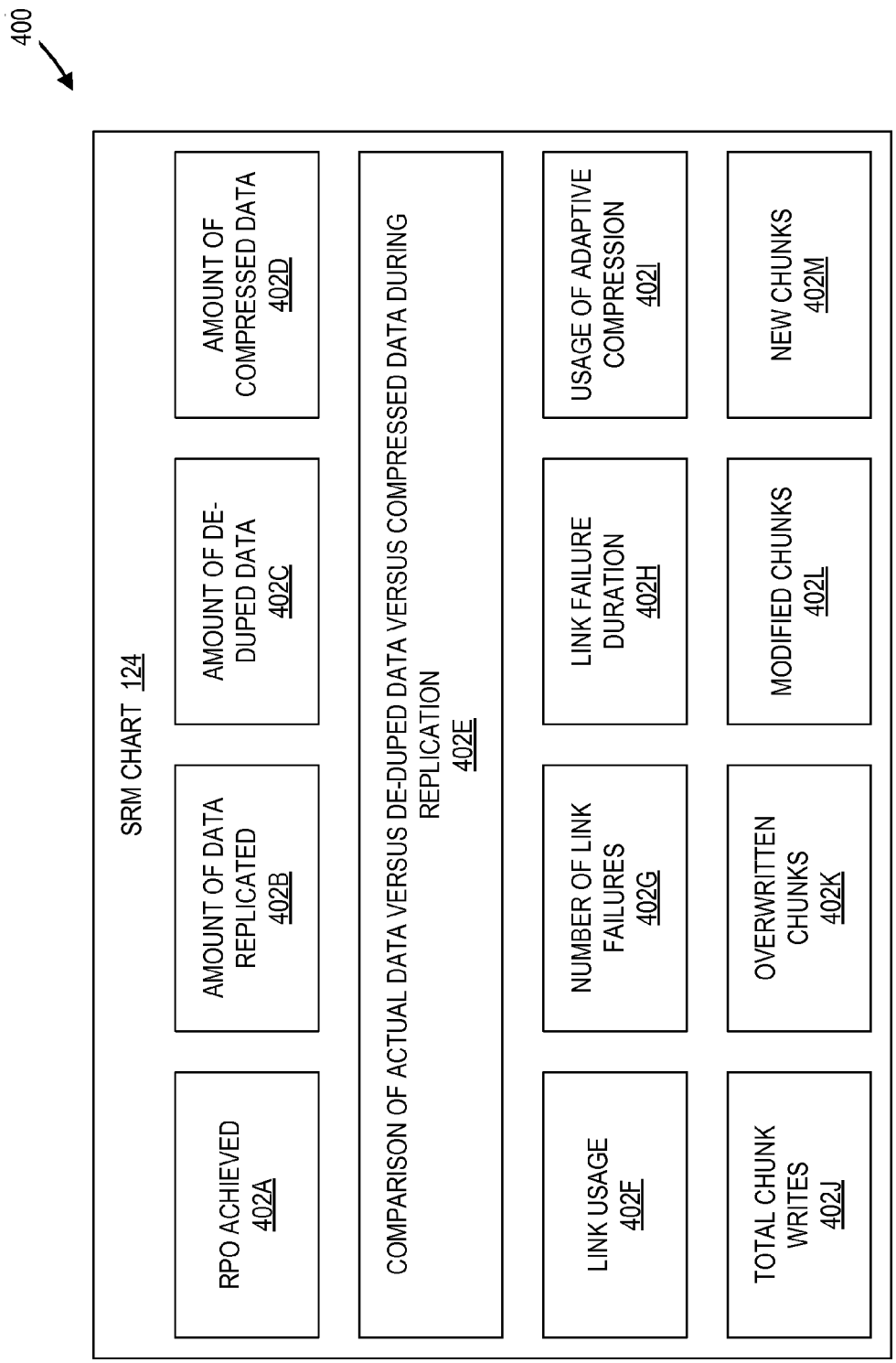
FIG. 4 is a diagram showing an illustrative configuration and arrangement of the storage resource management chart, in accordance with some embodiments.

Referring now to FIG. 4, additional details will be provided regarding the configuration and arrangement of the SRM chart 124, in accordance with some embodiments. The SRM module 114 may be adapted to collect information regarding data growth, system performance, memory usage, and the like. The SRM module 114 may collect this information at various levels of replication, including local snapshot creation and remote snapshot creation. The SRM module 114 may provide this information in the form of the SRM chart 124 in order to assist an administrator in monitoring and managing storage servers more efficiently. For example, the SRM chart 124 may provide information regarding replication rate, the type of delta data between the snapshots, network bandwidth, network traffic, volume growth, and the like. Through the SRM chart 124, the administrator can determine whether the configured replication solution meets the requirements of a given disaster recovery plan.

As illustrated in FIG. 4, a simplified SRM chart 124 is shown including various fields. A first field 402A shows information regarding whether the established RPO is achieved. A second field 402B shows information regarding the amount of data replicated. A third field 402C shows information regarding the amount of de-duped data (i.e., duplicate data that has been removed). A fourth field 402D shows information regarding the amount of compressed data during replication. A fifth field 402E shows information comparing actual data, de-duped data, and compressed data during replication. A sixth field 402F shows information regarding link usage. A seventh field 402G shows information regarding the number of link failures. An eighth field 402H shows information regarding link failure duration. A ninth field 402I shows information regarding usage of adaptive compression.

The fields 402A-402I may be updated in the SRM chart 124 when a remote snapshot is created in the secondary storage server 104. The following additional information may also be collected and displayed when a local snapshot is created in the primary storage server 102. A ninth field 402J may show the total number of chunk writes in the local snapshot. A tenth field 402K may show the number of overwritten chunks in the local snapshot. An eleventh field 402L may show the number of modified chunks in the local snapshot. A twelfth field 402M may show the number of new chunks in the local snapshot.

It should be appreciated that that the fields 402A-402M are merely examples and are not intended to be limiting. In particular, the SRM chart 124 may include more or less fields depending on the particular implementation. The SRM chart 124 may be configured and arranged in any suitable format. Further, the fields 402A-402M may display any suitable multimedia, including text, images, audio, video, and combinations thereof.

Figure 5:
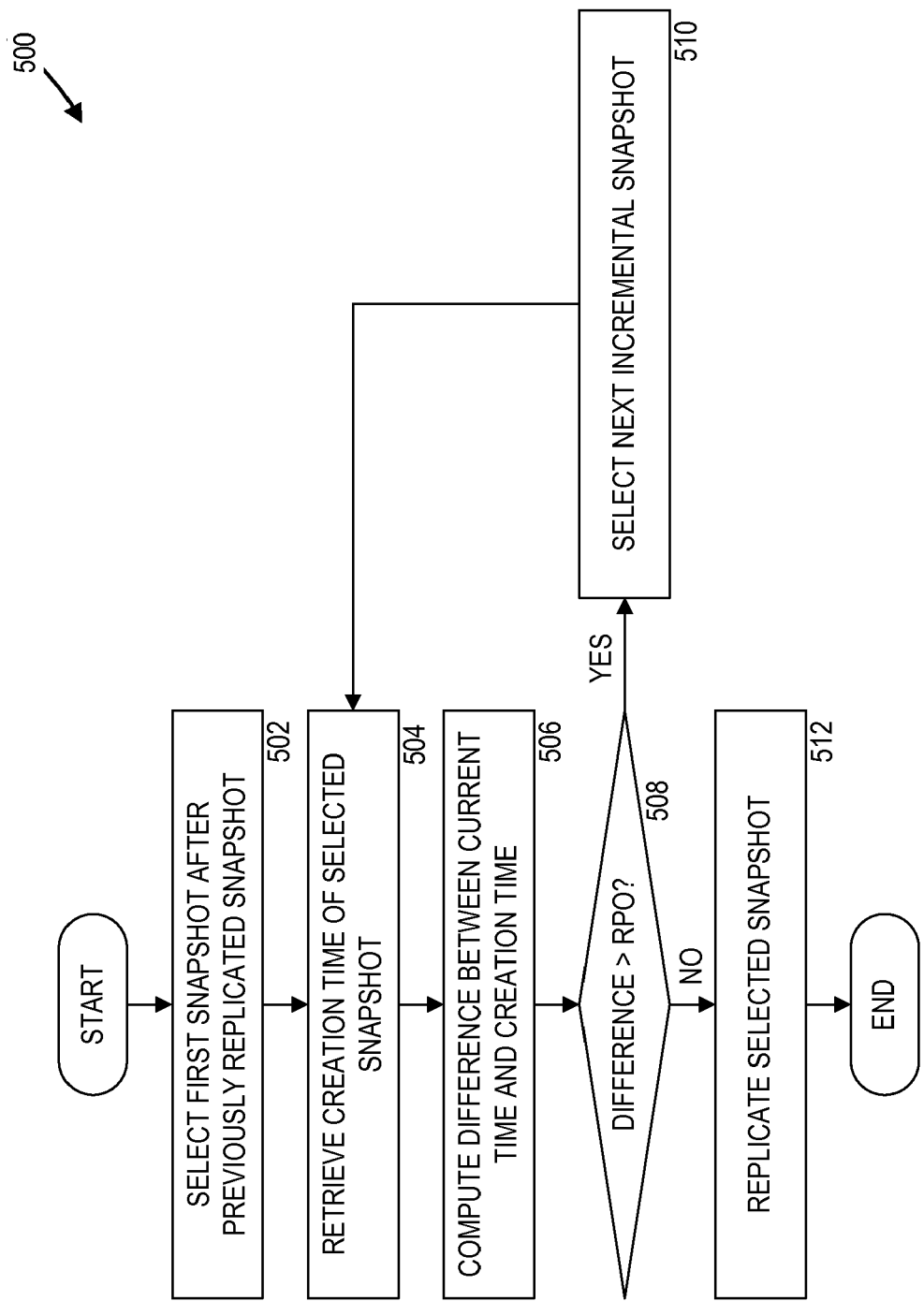
FIG. 5 is a flow diagram showing aspects of a method provided herein for skipping snapshots during a snapshot replication process based on time-related parameters, in accordance with some embodiments.
Figure 6:
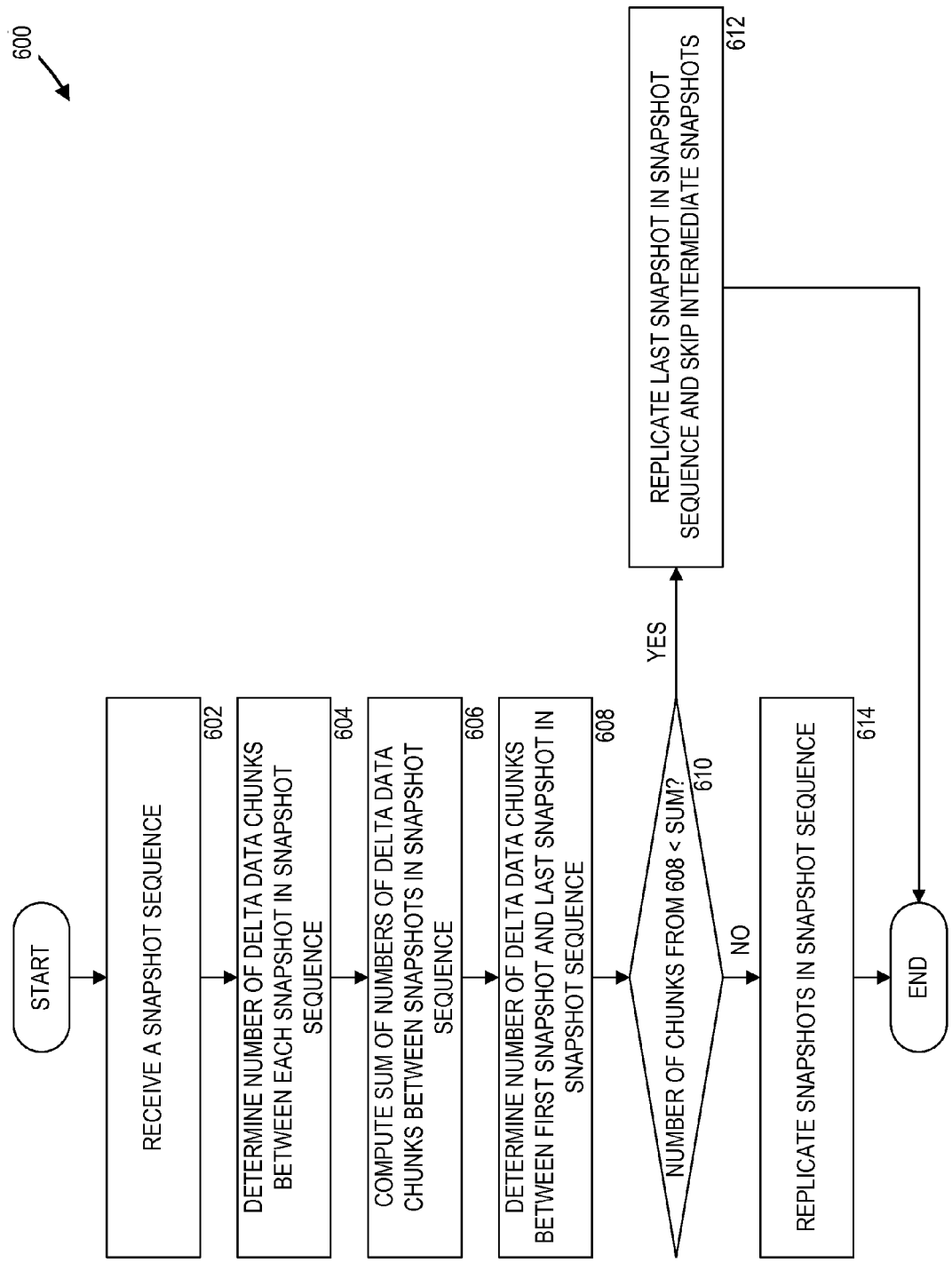
FIG. 6 is a flow diagram showing aspects of a method provided herein for skipping snapshots during a snapshot replication process based on delta data-related parameters, in accordance with some embodiments.

Referring now to FIGS. 5 and 6, additional details will be provided regarding the operation of the time-based module 130 and the delta data-based module 132. In particular, FIG. 5 is a flow diagram illustrating aspects of a method provided herein for skipping one or more snapshots during a snapshot replication process based on time-related parameters. FIG. 6 is a flow diagram illustrating aspects of a method provided herein for skipping one or more snapshots during a snapshot replication process based on delta data-related parameters. The time-based module 130 and the delta data-based module 132 may operate separately or in conjunction, depending on the particular implementation.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 5, a routine 500 may be performed by the time-based module 130. The routine 500 begins at operation 502, where the time-based module 130 selects the first snapshot after the previously replicated snapshot. In one example, after the initial snapshot 118 is replicated, the first additional snapshot 120A is the first snapshot after the previously replicated snapshot (i.e., the initial snapshot 118). In another example, after the first additional snapshot 120A is replicated, the second additional snapshot 120B is the first snapshot after the previously replicated snapshot (i.e., the first additional snapshot 120A). When the time-based module 130 selects the first snapshot after the previously replicated snapshot, the routine 500 proceeds to operation 504.

At operation 504, the time-based module 130 retrieves the creation time of the selected snapshot. The routine 500 then proceeds to operation 506, where the time-based module 130 computes the difference between the current time and the creation time of the selected snapshot. At operation 508, the time-based module 130 then determines whether the difference is greater than the established RPO. If the difference is greater than the established RPO, then the routine 500 proceeds to operation 510, where the time-based module 130 selects the next incremental snapshot. The routine 500 then proceeds back to operation 504, where the time-based module retrieves the creation time of the newly selected snapshot. If the difference is less than the established RPO, then the routine 500 proceeds to operation 512, where the time-based module 130 replicates the selected snapshot.

Referring to FIG. 6, a routine 600 may be performed by the delta data-based module 132. The routine 600 begins at operation 602, where the delta data-based module 132 receives a snapshot sequence. An example snapshot sequence may include the snapshots 302A-302C. The routine 600 then proceeds to operation 604, where the delta data-based module 132 determines the number of delta data chunks between each snapshot in the snapshot sequence. For example, in the snapshot sequence that includes the snapshots 302A-302C, the delta data-based module 132 may determine the number of delta data chunks between the first snapshot 302A and the second snapshot 302B and the number of delta data chunks between the second snapshot 302B and the third snapshot 302C. When the delta data-based module 132 determines the number of delta data chunks between each snapshot in the snapshot sequence, the routine 600 proceeds to operation 606.

At operation 606, the delta data-based module 132 computes the sum of the numbers of delta data chunks between the snapshots in the snapshot sequence. The routine 600 then proceeds to operation 608, where the delta data-based module 132 also determines the number of delta data chunks between the first snapshot and the last snapshot in the snapshot sequence. At operation 610, the delta data-based module 132 then determines whether the number of delta data chunks between the first snapshot and the last snapshot is substantially less than the sum. For example, the threshold may be a percentage, where the delta data-based module 132 may determine whether the number of delta data chunks between the first snapshot and the last snapshot is less than the sum by the threshold percentage.

If the delta data-based module 132 determines that the number of delta data chunks between the first snapshot and the last snapshot is substantially less than the sum, then the delta data-based module 132 proceeds to operation 612, where the delta data-based module 132 replicates the last snapshot in the sequence and skips the intermediate snapshots in the snapshot sequence. For example, in the snapshot sequence that includes the snapshots 302A-302C, the delta data-based module 132 may skip the second snapshot 302B and replicate the third snapshot 302C. If the delta data-based module 132 determines that the number of delta data chunks between the first snapshot and the last snapshot is not substantially less than the sum, then the delta data-based module 132 proceeds to operation 614, where the delta data-based module 132 replicates the snapshots in the snapshot sequence under the normal replication process.

Figure 7:
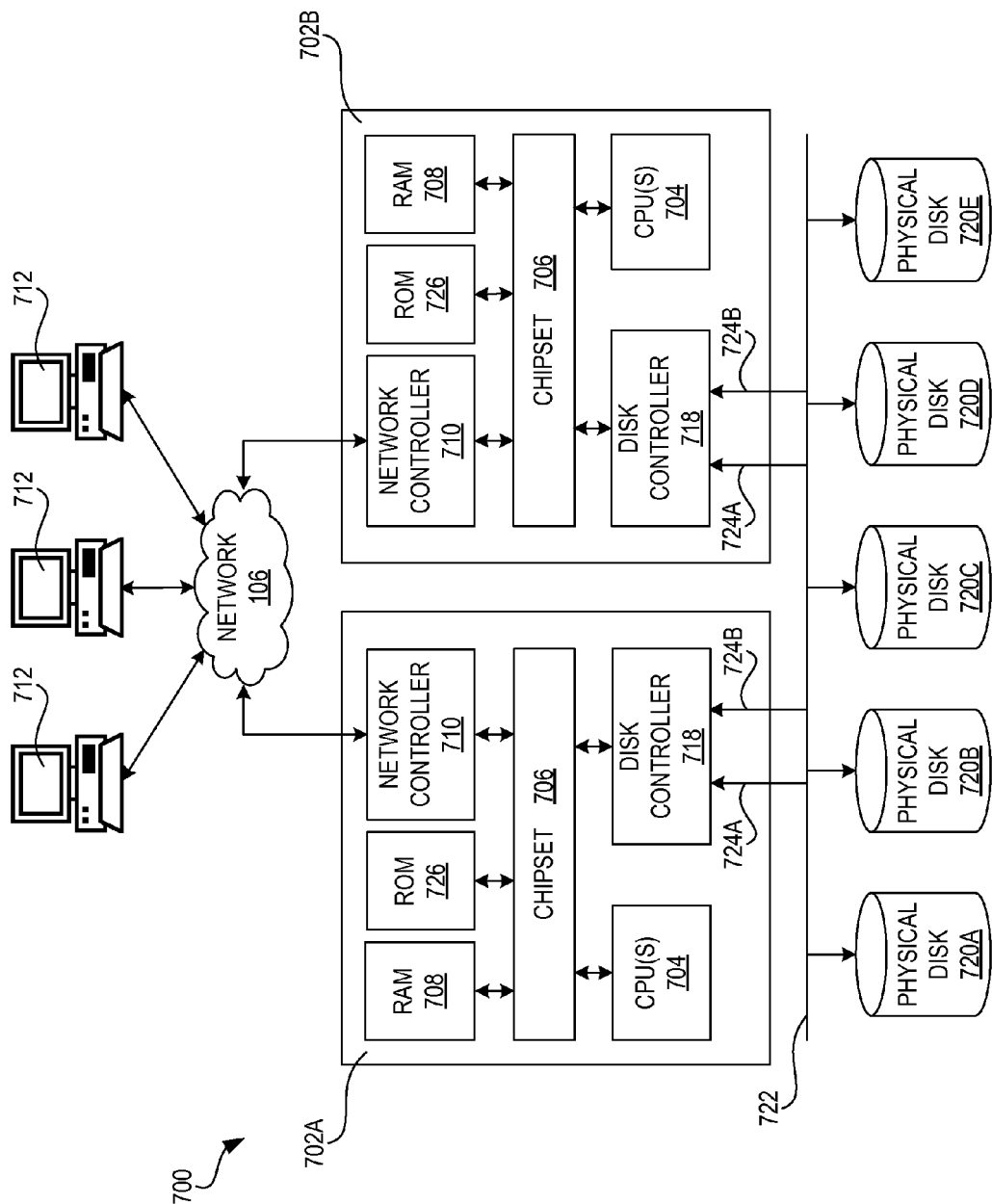
FIG. 7 is a computer architecture diagram showing aspects of an illustrative computer hardware architecture for a computing system capable of implementing aspects of the embodiments presented herein.

FIG. 7 and the following discussion are intended to provide a brief, general description of a suitable computing environment in which the embodiments described herein may be implemented. In particular, FIG. 7 shows an exemplary storage system 700 including two storage computers, or storage controllers 702A, 702B (also referred to herein as storage controller 702). Examples of the storage controller 702 include the primary storage server 102 and the secondary storage server 104. Each storage controller 702 includes a baseboard, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 are standard programmable processors that perform arithmetic and logical operations necessary for the operation of the storage controller 702.

The CPUs 704 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the storage controller 702. The chipset 706 also provides an interface to a random access memory ("RAM") 708 used as the main memory in the storage controller 702. The chipset 706 also includes functionality for providing network connectivity through a network controller 710, such as a gigabit Ethernet adapter. The network controller 710 is capable of connecting the storage controllers 702A, 702B to each other as well as to other client computers 712 acting as initiators of I/O operations over a network 106. The network 106 may be an Ethernet or Gigabyte Ethernet LAN, a fiber ring, a fiber star, wireless, optical, satellite, a WAN, a MAN, or any other network technology, topology, protocol, or combination thereof.

According to embodiments, each storage controller 702A, 702B is connected to a number of physical storage devices, such as physical disks 720A-720E (also referred to herein as physical disks 720) shown in FIG. 7. The physical disks 720 provide the data storage capacity required for the storage controller 702 to store data and service I/O operations initiated by the client computers 712 over the network 106. A disk controller 718 allows the storage controller 702 to communicate with the physical disks 720 connected to the storage controller. According to one embodiment, the disk controller 718 may interface with the physical disks 720 through a serial attached SCSI ("SAS") interface. In other embodiments, the disk controller 718 may interface with the physical disks 720 utilizing a serial advanced technology attachment ("SATA") interface, a fiber channel ("FC") interface, or other standard interface for physically connecting and transferring data between computers and physical storage devices.

According to embodiments, the physical disks 720 may be connected to the storage controller 702 through a bus 722 that allows the disk controller 718 to communicate with the disks. In one embodiment, the physical and electrical structure of the bus 722 may be based upon the storage bridge bay ("SBB") specification. The SBB specification defines mechanical, electrical, and low-level enclosure management requirements for a single enclosure that supports the connection of multiple storage controllers 702 as well as multiple physical disks 720 from a variety of hardware and system vendors. The SBB mid-plane provides the bus 722 that allows multiple storage controllers 702A, 702B to be connected to and communicate with the physical disks 720 concurrently.

In addition, the SBB mid-plane bus 722 provides facilities for the storage controllers 702A, 702B to communicate with each other via the SAS, SATA, or FC interface implemented on the bus. According to embodiments, the disk controller 718 is capable of utilizing multiple point-to-point communication channels, or ports 724A, 724B, to communicate with other devices over the SBB bus 722. For example, the disk controller 718 may utilize one or more ports 724A to communicate with each physical disk 720 across the bus 722, while utilizing a separate port 724B to communicate across the bus with the other storage controller 702. As will be described in more detail below, the disk controller 718 may only be capable as operating as either an "initiator" or a "target" in regard to each port 724A, 724B, but may be capable of operating as an initiator on one port 724A while simultaneously operating as a target on another port 724B.

The storage controller 702 may store data on the physical disks 720 by transforming the physical state of the disks to reflect the information being stored. The specific transformation of physical state may depend on various factors, in different implementations of this description. Examples of such factors may include, but are not limited to, the technology used to implement the physical disks 720, whether the physical disks are characterized as primary or secondary storage, and the like. For example, the storage controller 702 may store data to the physical disks 720 by issuing instructions to the disk controller 718 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The storage controller 702 may further read information from the physical disks 720 by detecting the physical states or characteristics of one or more particular locations within the devices.

In addition to the physical disks 720 described above, the storage controller 702 may have access to other computer-readable storage medium to store and retrieve information, such as program modules, data structures, or other data. It should be appreciated by those skilled in the art that computer-readable storage media can be any available media that can be accessed by the storage controller 702. By way of example, and not limitation, computer-readable storage media may include volatile and non-volatile, removable and non-removable media implemented in any method or technology. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the storage controller 702.

The computer-readable storage media may store an operating system (not shown) utilized to control the operation of the storage controller 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The computer-readable storage media may store other system or application programs and data utilized by the storage controller 702. In one embodiment, the computer-readable storage medium may be encoded with computer-executable instructions that, when loaded into the storage controller 702, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the storage controller 702 by specifying how the CPUs 704 transitions between states, as described above. According to one embodiment, the storage controller 702 may have access to computer-readable storage media storing computer-executable instructions that, when executed by the computer system, perform the routines for skipping one or more snapshots during a snapshot replication process, as described in greater detail above with reference to FIGS. 1-6.

The chipset 706 may also provide an interface to a computer-readable storage medium such as a ROM 726 or NVRAM for storing a firmware that includes program code containing the basic routines that help to startup the storage controller 702 and to transfer information between elements within the storage controller. The ROM 726 or NVRAM may also store other software components necessary for the operation of the storage controller 702 in accordance with the embodiments described herein. It will be appreciated that the storage controller 702 might not include all of the components shown in FIG. 7, may include other components that are not explicitly shown in FIG. 7, or may utilize an architecture completely different than that shown in FIG. 7.

Based on the foregoing, it should be appreciated that technologies for skipping one or more snapshots during a replication process are presented herein. In particular, the snapshots may be skipped based on time-related parameters or delta data-related parameters. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for skipping snapshots during a snapshot replication process, the computer-implemented method comprising computer-implemented operations for:

if a basis for skipping snapshots is time-related, skipping snapshots based on time-related parameters includes:
selecting a first snapshot created subsequently to a previously replicated snapshot, the previously replicated snapshot comprising at least a portion of a snapshot created prior to the first snapshot;
retrieving a creation time of the first snapshot;
computing a time difference between a current time and the creation time of the first snapshot;
determining whether the time difference between the current time and the creation time of the first snapshot is less than a recovery point objective;
in response to determining that the time difference between the current time and the creation time of the first snapshot is less than the recovery point objective, replicating the first snapshot in the snapshot replication process; and
in response to determining that the time difference between the current time and the creation time of the first snapshot is not less than the recovery point objective, skipping the first snapshot through the snapshot replication process;

if a basis for skipping snapshots is delta-data related, skipping snapshots based on delta data-related parameters includes:
receiving a snapshot sequence including a plurality of snapshots;
determining a number of delta data chunks between each snapshot in the snapshot sequence;
computing a sum of the numbers of delta data chunks between the snapshots in the snapshot sequence, the delta data chunks comprising new data and modified data and excluding old data that remains the same;
determining a number of delta data chunks between a first snapshot and a last snapshot in the snapshot sequence;
determining whether the number of delta data chunks between the first snapshot and the last snapshot in the snapshot sequence is less than a threshold percentage of the sum of the numbers of delta data chunks between the snapshots in the snapshot sequence; and
in response to determining that the number of delta data chunks between the first snapshot and the last snapshot in the snapshot sequence is less than the threshold percentage, skipping intermediate snapshots in the snapshot sequence and replicating the last snapshot in the snapshot sequence through the snapshot replication process.

2. The computer-implemented method of claim 1, wherein skipping the first snapshot through the snapshot replication process comprises:
   selecting a next snapshot incrementally following the first snapshot;
   retrieving a creation time of the next snapshot;
   computing a time difference between the current time and the creation time of the next snapshot;
   determining whether the time difference between the current time and the creation time of the next snapshot is less than the recovery point objective;
   in response to determining that the time difference between the current time and the creation time of the next snapshot is less than the recovery point objective, replicating the next snapshot through the snapshot replication process; and
   in response to determining that the time difference between the current time and the creation time of the next snapshot is not less than the recovery point objective, skipping the next snapshot through the snapshot replication process.

3. The computer-implemented method of claim 1, wherein the current time comprises a current time when the previously replicated snapshot is replicated.

4. The computer-implemented method of claim 1, wherein each of the snapshots reflects data as it existed on one or more data volumes at a particular point in time.

5. The computer-implemented method of claim 1, wherein one or more of the snapshots is taken in regular intervals.

6. The computer-implemented method of claim 1, wherein one or more of the snapshots is taken under direction of an administrator.

7. The computer-implemented method of claim 1, wherein replicating the first snapshot through the snapshot replication process comprises replicating delta data between the first snapshot and the previously replicated snapshot.

8. The computer-implemented method of claim 1, the computer-implemented method comprising computer-implemented operations for:
   providing a storage resource management chart adapted to display information regarding data replication rate.

9. The computer-implemented method of claim 1, wherein the snapshot sequence comprises at least the first snapshot taken at a given time, a second snapshot taken after the first snapshot, and a third snapshot taken after the second snapshot; and wherein skipping intermediate snapshots in the snapshot sequence and replicating the last snapshot in the snapshot sequence through the snapshot replication process comprises skipping the second snapshot and replicating the third snapshot in the snapshot sequence.

10. The computer-implemented method of claim 1, wherein each of the snapshots comprises a copy of a data volume at a given point in time.

11. The computer-implemented method of claim 1, wherein skipping intermediate snapshots in the snapshot sequence and replicating the last snapshot in the snapshot sequence through the snapshot replication process comprises replicating the delta data between the first snapshot and the last snapshot in the snapshot sequence.

12. The computer-implemented method of claim 1, the computer-implemented method comprising computer-implemented operations for:
   providing a storage resource management chart adapted to display information regarding network bandwidth, network traffic, and volume growth.

13. A system for skipping snapshots during a snapshot replication process, the system comprising:
   a processor; and
   a memory in communication with the processor, the memory having stored therein a time-based replication module and a delta data-based replication module executable by the processor, wherein:
   the time-based replication module is configured to
      select a first snapshot created subsequently to a previously replicated snapshot, the previously replicated snapshot comprising at least a portion of a snapshot created prior to the first snapshot,
      retrieve a creation time of the first snapshot,
      compute a time difference between a current time and the creation time of the first snapshot,
      determine whether the time difference between the current time and the creation time of the first snapshot is less than a recovery point objective,
      in response to determining that the time difference between the current time and the creation time of the first snapshot is less than the recovery point objective, replicate the first snapshot in the snapshot replication process, and
      in response to determining that the time difference between the current time and the creation time of the first snapshot is not less than the recovery point objective, skip the first snapshot through the snapshot replication process; and
   the delta data-based replication module is configured to
      receive a snapshot sequence including a plurality of snapshots,
      determine a number of delta data chunks between each snapshot in the snapshot sequence,
      compute a sum of the numbers of delta data chunks between the snapshots in the snapshot sequence, the delta data chunks comprising new data and modified data and excluding old data that remains the same,
      determine a number of delta data chunks between a first snapshot and a last snapshot in the snapshot sequence,
      determine whether the number of delta data chunks between the first snapshot and the last snapshot in the snapshot sequence is less than a threshold percentage of the sum of the numbers of delta data chunks between the snapshots in the snapshot sequence, and
      in response to determining that the number of delta data chunks between the first snapshot and the last snapshot in the snapshot sequence is less than the threshold percentage, skip intermediate snapshots in the snapshot sequence and replicate the last snapshot in the snapshot sequence through the snapshot replication process.

14. The system of claim 13, wherein to skip the first snapshot through the snapshot replication process, the time-based replication module is further configured to
   select a next snapshot incrementally following the first snapshot,
   retrieve a creation time of the next snapshot,
   compute a time difference between the current time and the creation time of the next snapshot,
   determine whether the time difference between the current time and the creation time of the next snapshot is less than the recovery point objective,
   in response to determining that the time difference between the current time and the creation time of the next snapshot is less than the recovery point objective, replicate the next snapshot through the snapshot replication process, and in response to determining that the time difference between the current time and the creation time of the next snapshot is not less than the recovery point objective, skip the next snapshot through the snapshot replication process.

15. The system of claim 13, wherein the snapshot sequence comprises at least the first snapshot taken at a given time, a second snapshot taken after the first snapshot, and a third snapshot taken after the second snapshot; and wherein skipping intermediate snapshots in the snapshot sequence and replicating the last snapshot in the snapshot sequence through the snapshot replication process comprises skipping the second snapshot and replicating the third snapshot in the snapshot sequence.

16. The system of claim 13, wherein the current time comprises a current time when the previously replicated snapshot is replicated.

* * * * *